Figures 1, 2:
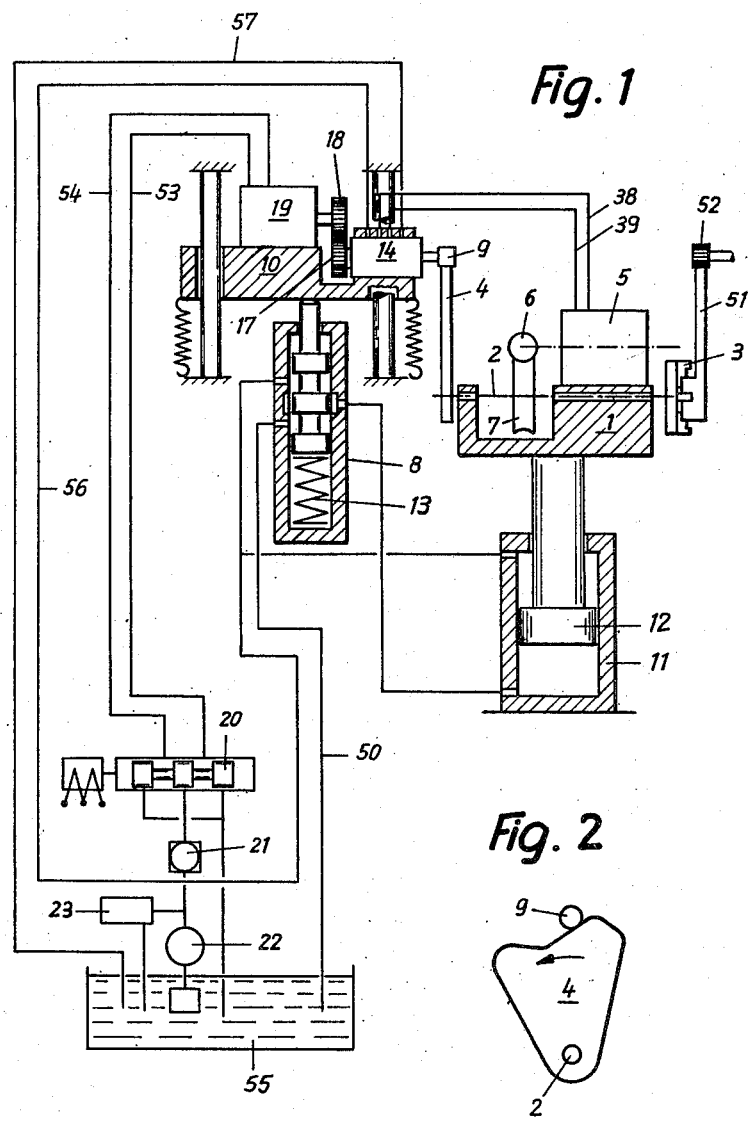

May 11, 1965 E. SCHNITZER 3,182,559
CHIP-REMOVING COPYING MACHINE TOOL
Filed Jan. 30, 1963 2 Sheets-Sheet 2
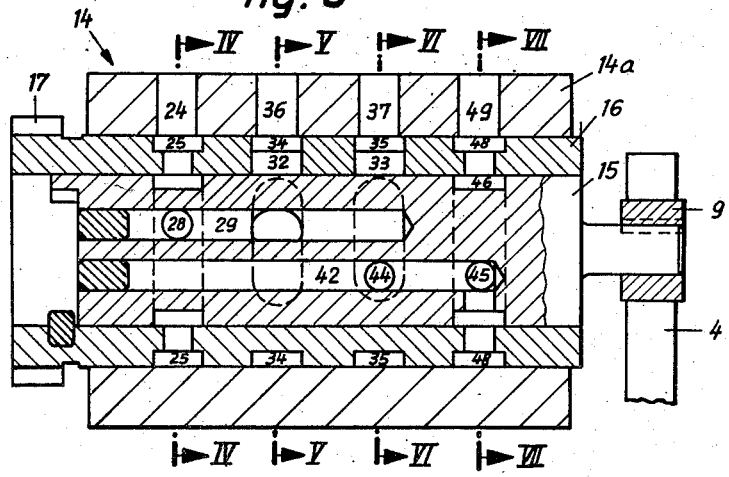
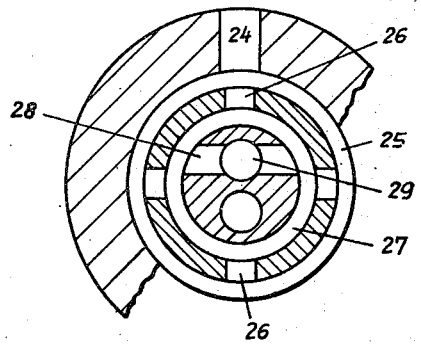
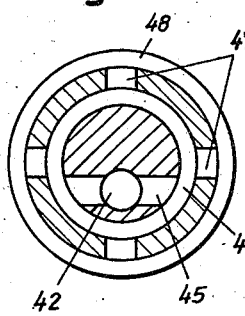
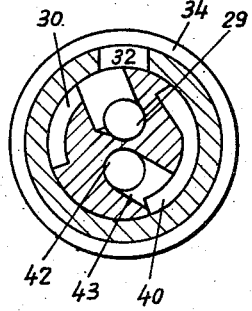
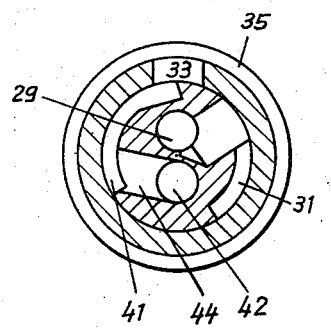

United States Patent Office 3,182,559
Patented May 11, 1965

3,182,559
CHIP-REMOVING COPYING MACHINE TOOL
Erich Schnitzer, Jestetten, Germany, assignor to Schweizerische Industrie-Gesellschaft, Neuhausen am Rheinfall, Switzerland
Filed Jan. 30, 1963, Ser. No. 254,861
Claims priority, application Switzerland, Feb. 5, 1962, 1,398/62
4 Claims. (Cl. 90—13.4)

The present invention relates to chip-removing copying machine tools and more particularly to copying milling machines for the production of cams and the like in reproduction of a master template.

The invention has the primary object of providing a method and a device for keeping the speed of advance of the work piece relative to the chip-removing tool constant without recourse to a second, auxiliary template as hitherto used for this purpose, and thus to obviate the additional costs and complications involved by the use of such auxiliary template, particularly when machining a comparatively small number of identical work pieces off a certain template. It has been known in the art to be advantageous to keep said speed of advance constant over the entire perimeter of the work piece to be machined, since in this manner a minimum of machining time, uniformity of the machining pattern and maximum utilization of the tools is achieved.

With this and other objects in view which will become apparent later from this specifiication and the accompanying drawings, I provide a method for the copying of a template on a work piece by chip-removing machining, comprising the steps of moving said work piece and template in unison, sensing said template by means of a sensing roller, comparing the rotational speed of said sensing roller with a constant rotational speed of reference, and controlling the speed of said template and work piece responsive to deviations of the rotational speed of said sensing roller from said reference speed, and machining said work piece at its speed of advance thus regulated at a substantially constant value.

I also provide a device for carrying out said method, comprising in combination: a fixed structure, a cutter tool mounted in said structure, a work piece and a template mounted movably in unison in said structure, said cutter tool in operation machining said work piece, a sensing roller in rolling contact with said template, a follow-up regulator means, said sensing roller forming the master component of said follow-up regulator means and being in turn kept at a constant rotational speed by said follow-up regulator means and in operative connection with said work piece tending to keep the speed of advance of said work piece constant relative to said cutter tool.

These and other features of my said invention will be clearly understood from the following description of a preferred embodiment of a device for carrying out the method according to the invention illustrated by way of example in the accompanying drawings, in which:

FIG. 1 is a diagrammatic illustration of a device for keeping the speed of advance of a copying milling machine constant, FIG. 2 is a front elevation of a template with sensing roller, FIG. 3 is a longitudinal section of the feeler aggregate connected with the sensing roller, FIGS. 4–7 are transverse sections of the feeler aggregate according to FIG. 3 on the lines IV—IV to VII—VII respectively.

The device according to FIG. 1 comprises a casing 1, in which the spindle 2 of a milling machine is journalled. At one end of the spindle 2 there is mounted the clamping chuck 3 for a work piece 51, which is to be machined by a milling cutter 52, and at the other end thereof there is mounted the template 4, in accordance with which the work piece is to be machined. The drive of the spindle 2 of the milling machine is effected by a hydraulic motor 5 through a worm 6 and a worm wheel 7. The copying feeler 8 is operated by the sensing roller 9 and the carriage 10, which is movable in the vertical direction. The control movements of the feeler 8 are transmitted to the casing 1 through a hydraulic cylinder 11 and piston 12.

FIG. 2 shows a template 4 with the sensing roller 9. Upon movement of the template in the direction indicated by the arrow, the same bears on the sensing roller 9, and accordingly moves the carriage 10 upward. Consequently the piston valve of the feeler 8 may likewise move upward under the bias of a spring 13. Accordingly oil can flow below the hydraulic piston 12 through the piston valve of the feeler 8 into the drain 50. Thereby a lowering of the casing 1 is effected in such a manner, that the milling cutter 52 imparts the shape of the template 4 to the work piece 5 clamped in the chuck 3.

The sensing roller 9 is fixedly connected with the innermost part 15 of a feeler aggregate 14. This part is mounted rotatably in a tubular member 16, which is in turn rotatably mounted in the casing portion 14a (conf. FIG. 3). The member 16 is connected with a spur gear 17, which is in mesh with a spur gear 18 (FIG. 1) driven by a hydraulic motor 19. This hydraulic motor 19 is driven by pressure oil, which is supplied to it by the pipes 53, 54 from a slide valve 20, which is in turn in communication with a pump 22 through a flow governor 21. A safety valve is denoted 23, through which the pressure oil pumped by the pump 22 and not consumed by the hydraulic motor flows back into the oil sump 55.

The control of the rotational speed of the spindle 2 for the work piece and the template is effected in such a manner that a predetermined constant rotational speed is imparted to the member 16 of the feeler aggregate by the hydraulic motor 19. The feeler aggregate in turn apportions a certain quantity of pressure oil to the hydraulic motor 5, whereby the latter drives the spindle 2 at a certain rotational speed. The template 4 partakes in the rotation of the spindle 2, and drives the sensing roller 9 and with it the part 15 of the feeler aggregate 14 at a rotational speed, which in the normal condition corresponds to the rotational speed of the member 16. This rotational speed of the components 16 and 15 corresponds to the desired speed of advance, at which the work piece 51 is moved relative to the milling cutter 52. When the sensing roller 9 tends to run slower or faster than the member 16, the flow of oil supplied to the hydraulic motor 5 is varied by the feeler aggregate 14 in such a manner that the spindle 2 is driven at a rotational speed, at which the sensing roller 9 again has the rotational speed of the member 16. This is accordingly a follow-up regulation with a rotary feeler aggregate, through which a constant rotational speed is imparted to the sensing roller.

Hereinafter the manner of operation of the feeler aggregate 14 will be explained in more detail: The pressure oil is supplied by the pump 22 to the feeler aggregate 14 through the pipe 56 and the bore 24 (FIGS. 3 and 4). The oil passes through the bore 24, the annular duct 25 and four bores 26, the annular duct 27, the transverse bore 28 into the longitudinal bore 29. From this bore 29 the pumped oil flows into the recess 30. Hence it passes through the bore 32, annular chamber 34, bore 36 into the pipe 38, through which it passes to the hydraulic motor 5. The oil emerging from the hydraulic motor flows back through the bore 37 into the feeler aggregate. There the oil passes through the annular duct 35, bore 33, recess 41, transverse bore 44 into the longitudinal bore 42. This bore 42 conducts the oil to the transverse bore 45. The oil then flows through the annular chamber 46, the four bores 47, the annular chamber 48 into the bore 49. The oil leaves the feeler aggregate through this bore 49, and is returned into the oil sump 55 through the pipe 57.

By appropriate adjustment of the two components 15 and 16 of the feeler aggregate 14 relative to one another, the bore 37 and the pipe 39 may be brought into communication with the oil supply, while the bore 36 and accordingly the pipe 38 is connected to drain. In this way there exists the possibility of reversing the sense of rotation of the spindle 2 driven by the hydraulic motor 2.

When between the components 15 and 16 of the feeler a relative movement takes place, so that the part 15 of the feeler precedes in the clockwise sense (FIG. 2), the cross sectional area available to the through-flow is correspondingly reduced between the recesses 30 and 41, respectively, of the innermost part 15 and the bores 32 and 33, respectively, of the outer member 16. The volume of oil flowing through the hydraulic motor is accordingly reduced. Upon a relative movement of the components 15 and 16 in the clockwise sense these cross sectional areas available to the through-flow increase, and the volume of oil supplied to the hydraulic motor increases correspondingly. By the control described the hydraulic motor 5 and with it the spindle 2 are forced to rotate at a speed, which corresponds to a constant rotational speed of the sensing roller 9 as determined by the rotational speed of the outer member 16 of the feeler aggregate 14.

The foregoing description is based on a hydraulic drive of the rotary feeler 14. However, this drive could alternatively be effected electrically, mechanically or in any combination, and likewise a mechanical or electrical drive could be provided for the spindle 2 instead of the hydraulic drive. In this case, instead of the hydraulic rotary feeler aggregate 14 an electrical feeler aggregate would be used with appropriate adjustment means.

While I have herein described, and illustrated in the accompanying drawings what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. In a duplicating machine tool, a movable spindle support, a spindle journaled in said support, hydraulic motor means on said support for driving said spindle, a workpiece and a template affixed to said spindle, a cutter tool presented to said workpiece adapted to be operated at a constant speed, hydraulic means for moving said spindle toward and away from said cutter tool, a sensing support movably mounted adjacent said spindle support, a feeler regulator controlled by the movement of said sensing support, a pressure fluid source for said hydraulic spindle moving means, said feeler regulator being adapted to control the flow of pressure fluid to said hydraulic spindle moving means, a follow-up regulator mounted on said sensing support, hydraulic motor means on said sensing support for driving one of the ported components of said follow-up regulator, a sensing roller adapted to be engaged by the template to control another component of said follow-up regulator, the hydraulic motor means on said sensing support being connected to said source of pressure fluid means and the components of said follow-up regulator being connected to said source of pressure fluid means and said hydraulic motor means on said spindle support whereby the rotational speed of said sensing roller will be maintained constant and the hydraulic motor means drivingly connected to said spindle will be regulated by said sensing roller and thus maintain the speed at which said workpieces advance constant with respect to said cutting tool.

2. In a duplicating machine tool as set forth in claim 1, in which one of the components of said follow-up regulator is directly connected to said sensing roller end the other component is rotated at a constant reference speed by the hydraulic motor means on said sensing support, whereby the rotational speed of the spindle carrying said workpiece will be influenced by said follow-up regulator.

3. In a duplicating machine tool as set forth in claim 1, in which the components of said follow-up regulator are ported to provide a hydraulic valve interposed between said source of pressure fluid and the hydraulic motor means for controlling the flow of pressure fluid thereto as well as controlling the return of said pressure fluid to said source.

4. In a duplicating machine tool as set forth in claim 3, wherein said hydraulic valve comprises an inner ported component rotatably connected with said sensing roller and an outer ported component surrounding said inner component and operatively connected with said hydraulic motor means on said sensing support so that the same will be rotated at a predetermined constant reference speed, both of said components having cooperating ports adapted to align one with the other when said components rotate at the same speed and to be varied to change the flow path of the pressure fluid when the rotational speed of said inner component deviates from the reference speed of said outer component, said ports being arranged to control the supply of pressure fluid to and from said hydraulic motor.

References Cited by the Examiner
UNITED STATES PATENTS
1,741,833  12/29  Ferris.
2,415,801  2/47   Armitage et al. _____ 90—13.4

WILLIAM W. DYER, Jr., *Primary Examiner.*
LEON PEAR, *Examiner.*